(12) United States Patent
Chen et al.

(10) Patent No.: US 7,734,253 B2
(45) Date of Patent: Jun. 8, 2010

(54) APPARATUS AND METHODS FOR COEXISTENCE OF COLLOCATED WIRELESS LOCAL AREA NETWORK AND BLUETOOTH® BASED ON DYNAMIC FRAGMENTATION OF WLAN PACKETS

(75) Inventors: Camille C. Chen, Cupertino, CA (US); Kristoffer D. Fleming, Chandler, AZ (US); Boris Ginzburg, Haifa (IL); Gordon Chinn, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1166 days.

(21) Appl. No.: 10/811,155

(22) Filed: Mar. 29, 2004

(65) Prior Publication Data

US 2005/0215197 A1 Sep. 29, 2005

(51) Int. Cl.
| | |
|---|---|
| H04B 5/00 | (2006.01) |
| H04B 7/00 | (2006.01) |
| H04B 1/00 | (2006.01) |
| G01R 31/08 | (2006.01) |
| G06F 11/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ............... 455/41.2; 455/41.1; 455/63.1; 455/522; 370/252; 370/329; 370/338; 370/349

(58) Field of Classification Search ............... 455/41.2, 455/41.3, 151.2, 426.2, 554.2, 41.1, 63.3, 455/420, 454, 277.2, 414.4, 456.1, 522.1, 455/63.1, 67.1, 67.13, 114.2, 278.1, 296, 455/522; 370/338, 349, 350, 395.53, 280, 370/328, 329, 344, 352, 389, 428, 252, 253, 370/465, 487, 230, 230.1, 235, 237, 239, 370/278, 282, 445
See application file for complete search history.

(56) References Cited

U.S. PATENT DOCUMENTS 6,549,781 B1 * 4/2003 O'Byrne et al. ............ 455/446

(Continued)

*Primary Examiner*—Nay A Maung
*Assistant Examiner*—Paul P Tran
(74) *Attorney, Agent, or Firm*—Pearl Cohen Zedek Latzer, LLP

(57) ABSTRACT

In some embodiments of the invention, an 802.11-enabled device may fragment an 802.11 packet into smaller packets and transmit the smaller packets instead of the 802.11 to lessen interference with Bluetooth synchronized connection-oriented communication of a collocated Bluetooth-enabled device.

26 Claims, 3 Drawing Sheets

U.S. PATENT DOCUMENTS

| | | | |
|---|---|---|---|
| 6,571,089 B1* | 5/2003 | Richards et al. | 455/266 |
| 6,842,607 B2* | 1/2005 | Godfrey et al. | 455/41.2 |
| 6,895,255 B1* | 5/2005 | Bridgelall | 455/552.1 |
| 7,039,358 B1* | 5/2006 | Shellhammer et al. | 455/41.2 |
| 7,046,649 B2* | 5/2006 | Awater et al. | 370/338 |
| 7,079,812 B2* | 7/2006 | Miller et al. | 455/63.1 |
| 7,471,667 B2* | 12/2008 | Hirsch et al. | 370/348 |
| 7,643,463 B1* | 1/2010 | Linsky et al. | 370/344 |
| 2002/0136183 A1* | 9/2002 | Chen et al. | 370/338 |
| 2003/0002473 A1* | 1/2003 | Goodings et al. | 370/349 |
| 2003/0037033 A1* | 2/2003 | Nyman et al. | 707/1 |
| 2003/0125019 A1* | 7/2003 | Bajikar | 455/420 |
| 2003/0139136 A1* | 7/2003 | Pattabiraman | 455/41 |
| 2004/0125779 A1* | 7/2004 | Kelton et al. | 370/338 |
| 2004/0152416 A1* | 8/2004 | Dahl | 455/41.2 |
| 2004/0165576 A1* | 8/2004 | Reunamaki | 370/350 |
| 2004/0242159 A1* | 12/2004 | Calderon et al. | 455/63.3 |
| 2005/0239474 A9* | 10/2005 | Liang | 455/454 |

\* cited by examiner

US 7,734,253 B2

APPARATUS AND METHODS FOR COEXISTENCE OF COLLOCATED WIRELESS LOCAL AREA NETWORK AND BLUETOOTH® BASED ON DYNAMIC FRAGMENTATION OF WLAN PACKETS

BACKGROUND OF THE INVENTION

Certain standards for wireless communication that were developed by separate standardization bodies use overlapping frequency bands. For example, both the 802.11 specifications for Wireless LAN Medium Access Control (MAC) and Physical layer (PHY), developed by the Institute of Electrical and Electronics Engineers (IEEE) and the Bluetooth® core specifications v1.1 published by the Bluetooth® special interest group (SIG) operate in the 2.4 gigaHertz (GHz) frequency band.

Wireless communication compatible with one of these standards may interfere with collocated wireless communication compatible with another of these standards.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

In one embodiment of the invention, a Bluetooth-enabled device communicating Bluetooth synchronous connection-oriented communication may be identified. An 802.11 racket that is to be transmitted substantially concurrently with at least a portion of the Bluetooth communication may be fragmented into smaller packets, and the smaller packets may be transmitted instead of the 802.11 packet.

Figure 1:
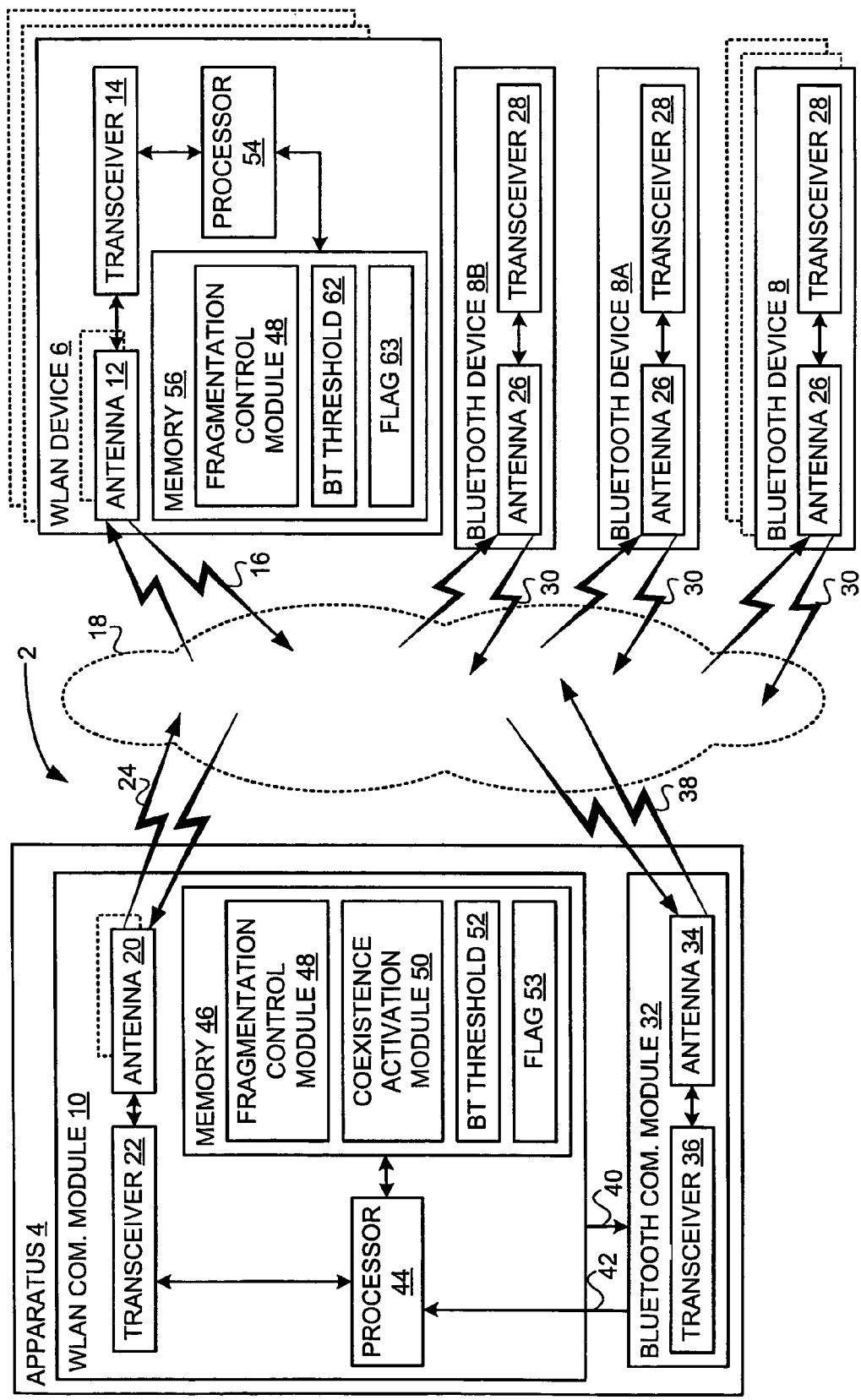
FIG. 1 is a simplified block-diagram illustration of an exemplary wireless communication system, in accordance with some embodiments of the invention.

FIG. 1 is a simplified block-diagram illustration of an exemplary wireless communication system 2, in accordance with some embodiments of the invention. Wireless communication system 2 may include an apparatus 4, and may additionally include one or more than one wireless local area network (WLAN) devices 6 and one or more than one Bluetooth® (BT) devices 8.

A non-exhaustive list of examples for apparatus 4 includes a WLAN station, a WLAN access point (AP), a work station, a server computer, a notebook computer, a laptop computer, a desktop personal computer, a personal digital assistant (PDA) computer, a hand-held computer, a WLAN-to-BT bridge, and the like.

A non-exhaustive list of examples for WLAN devices 6 includes WLAN stations, WLAN APs, work stations, server computers, notebook computers, laptop computers, desktop personal computers, PDA computers, hand-held computers, WLAN access points, WLAN mobile units, WLAN stationary units, WLAN add-on cards, WLAN personal computer memory card international association (PCMCIA) cards, WLAN personal computer (PC) cards, WLAN switches, WLAN routers, WLAN servers, game consoles, digital cameras, digital video cameras, television sets, and the like.

A non-exhaustive list of examples for BT devices 8 includes any of the following:

BT enabled human interface devices (HID) such as keyboards, mice, remote controllers, digital pens, and the like, BT enabled audio devices such as headsets, loudspeakers, microphones, cordless telephones, handsets, stereo headsets and the like, BT enabled computerized devices such as notebook computers, laptop computers, desktop personal computers, PDA computers, hand-held computers, cellular phones, moving picture experts group layer-3 audio (MP3) players, printers, facsimile machines, and the like, and BT communication adapters such as universal serial bus (USB) adapters, PCMCIA cards, compact flash (CF) cards, mini peripheral component interconnect (PCI) cards, BT APs, and the like.

Apparatus 4 may include a WLAN communication module 10. WLAN devices 6 and WLAN communication module 10 may meet the following standards and/or other existing or future related standards, although this is a non-exhaustive list:

ANSI/IEEE standard 802.11 for Wireless LAN Medium Access Control (MAC) and Physical layer (PHY) specifications:

Rev. b for Higher-speed physical layer extension in the 2.4 GHz band, published 1999, Rev. g for Further Higher data rate extension in the 2.4 GHz band, published 2003.

WLAN communication module 10 may be a removable module, such as, for example, a WLAN add-on card, a WLAN PCMCIA card, a WLAN PC card, and the like, or a non-removable module internal to apparatus 4, such as, for example, a mini PCI card.

WLAN devices 6 may each include one or more than one antennae 12, and a transceiver 14 coupled to antennae 12. WLAN devices 6 may be capable of transmitting respective WLAN signals 16 into a wireless medium 18, and of receiving signals from wireless medium 18. Similarly, WLAN communication module 10 may include one or more than one antennae 20, and a transceiver 22 coupled to antennae 20. WLAN communication module 10 may be capable of transmitting a WLAN signal 24 into wireless medium 18, and of receiving signals from wireless medium 18.

WLAN devices 6 may be suitable to communicate with one another and with WLAN communication module 10 over wireless medium 18 in accordance with a particular WLAN standard, such as, for example, ANSI/IEEE standard 802.11 Rev. b or Rev. g ("802.11 b/g"). Therefore, WLAN devices 6 and apparatus 4 can be referred to as "802.11-enabled devices". Although the following description refers to definitions of 802.11 b/g, it will be obvious to those skilled in the art how to modify the following for other WLAN standards.

802.11 b/g defines fourteen alternative WLAN communication channels in the 2.4 giga Hertz) Federal Communication Commission (FCC) defined Industrial, scientific and Medical (ISM) band to be used by WLAN devices to communicate with one other. Table 1 shows WLAN carrier frequencies $F_{CWLAN}$ of the fourteen WLAN communication channels defined by 802.11 b/g.

TABLE 1

| WLAN Communication Channel Number | Carrier Frequency $F_{CWLAN}$ [GHz] |
|---|---|
| 1 | 2.412 |
| 2 | 2.417 |
| 3 | 2.422 |
| 4 | 2.427 |
| 5 | 2.432 |
| 6 | 2.437 |
| 7 | 2.442 |
| 8 | 2.447 |
| 9 | 2.452 |
| 10 | 2.457 |
| 11 | 2.462 |
| 12 | 2.467 |
| 13 | 2.472 |
| 14 | 2.484 |

A 802.11 b/g WLAN is based on a cellular architecture where the system is subdivided WLAN cells. One type of WLAN cell, known as a basic service set (BSS), contains WLAN stations controlled by a WLAN AP, and another type of WLAN cell, known as an independent basic service set (IBSS), contains WLAN stations which are not controlled by a WLAN AP.

In a BSS, WLAN stations may communicate with the WLAN AP over a common WLAN communication channel using a time sharing scheme. In an IBSS, WLAN stations may communicate directly with other WLAN stations over a common WLAN communication channel using a time sharing scheme. WLAN access points of different BSSs may be connected via a distribution system (DS). The entire interconnected WLAN including the different WLAN cells, their respective WLAN access points and the distribution system may be known as an extended service set (ESS).

For example, WLAN communication module 10 may act as a WLAN AP, connected in a BSS WLAN cell configuration over WLAN signals 16 and 24 to WLAN devices 6 acting as WLAN stations, using a common WLAN communication channel. In another example, WLAN communication module 10 and WLAN devices 6 may be all connected as WLAN stations in an IBSS cell configuration over WLAN signals 16 and 24, using a common WLAN communication channel.

BT devices 8 may each include an antenna 26, and a transceiver 28 coupled to antenna 26. BT devices 8 may be capable of transmitting respective BT signals 30 into wireless medium 18, and of receiving signals from wireless medium 18.

Apparatus 4 may include a BT communication module 32. BT communication module 32 may include an antenna 34, and a transceiver 36 coupled to antenna 34. BT communication module 32 may be capable of transmitting a BT signal 38 into wireless medium 18, and of receiving signals from wireless medium 18.

BT devices 8 and BT communication module 32 may meet Bluetooth® core specifications v1.1, published by the Bluetooth® special interest group (SIG) and/or other existing or future related standards. In addition, any one of BT devices 8 may, or may not, meet Bluetooth® core specifications v1.2, which contains Adaptive Frequency Hopping (AFH) specification support, and BT communication module 32 may or may not, meet Bluetooth® core specifications v1.2.

BT devices 8 and BT communication module 32 may be suitable to communicate with one another over BT signals 30 and 38 in accordance with those specifications. Therefore, BT devices 8 and apparatus 4 can be referred to as "Bluetooth®-enabled devices". Although the following description refers to definitions of Bluetooth® core specifications v1.1 and v1.2, it will be obvious to those skilled in the art how to modify the following for other communication standards.

BT communication module 32 may be a removable module, such as, for example, a BT add-on card, a BT PCMCIA card, a BT PC card, a CF card, and the like, or a non-removable module internal to apparatus 4, such as, for example, a mini PCI card.

Bluetooth ® core specifications v1.1 and v1.2 define seventy-nine BT carrier frequencies in the ISM band to be used by BT components to communicate with one other. The BT carrier frequencies ($F_{CBT}$) are in the range of 2.402 GHz to 2.480 GHz and are spaced 1 mega Hertz (MHz).

According to Bluetooth® core specifications v1.1 and v1.2, two or more BT devices may communicate over a "piconet channel", in which one of the BT devices may serve as a piconet master, and the rest of the BT devices may serve as piconet slaves. Piconet slaves may communicate only with the piconet master, and may do so in response to being addressed by the piconet master.

A piconet channel is characterized by a periodic pseudo random hopping sequence through BT carrier frequencies at substantially equal time intervals ("BT time slots") of 625 micro seconds (uS), used to reduce the effects of interference and for regulatory reasons. The pseudo random hopping sequence is determined by the piconet master, and the piconet slaves are required to remain synchronized to the pseudo random hopping sequence.

If the piconet master and/or at least one of the slaves do not comply with Bluetooth® core specifications v1.2, and are therefore not AFH compatible, the piconet channel may hop between all seventy nine BT carrier frequencies. If the piconet master and all the slaves do comply with Bluetooth® core specifications v1.2, and are therefore AFH compatible, the piconet master may optionally define a selected reduced number of BT carrier frequencies for the pseudo random hopping sequence.

In the following discussion, a specific exemplary communication system 2 is described; however, the scope of the invention is not limited in this respect. In this specific example, BT communication module 32 is connected with one or more BT devices 8 in a piconet channel, in which BT communication module 32 is a piconet master and the connected BT devices 8 are piconet slaves, and WLAN communication module 10 is a WLAN AP, connected in a BSS WLAN cell configuration to WLAN devices 6 acting as WLAN stations.

A BT carrier frequency may overlap a WLAN communication channel from time to time during variable length time intervals denoted here as "interference time intervals". During such interference time intervals, various signals in communication system 2 may be corrupted or masked. These signals may include, for example, any of the following: BT signals 30, as received by BT communication module 32; BT signal 38, as received by BT devices 8; WLAN signals 16, as received by WLAN communication module 10; and WLAN signal 24, as received by WLAN devices 6.

Some BT packets communicated over the piconet channel may be "critical BT packets" that ought to be communicated "on time" and in an uninterrupted manner to avoid faulty results.

Such critical BT packets may be, for example, BT packets related to the establishment and maintenance of the piconet channel. According to Bluetooth® core specifications v1.1 and/or v1.2, interrupted or delayed communication of such critical BT packets, may result in damage to the piconet channel, such as, for example, an unintended disconnection of BT communication module 32 or one of BT devices 8 from the piconet channel. A non-exhaustive list of examples of such critical BT packets may be BT packets related to inquiries during device discovery, BT packets related to paging and paging response during connection set up, BT packets related to sniff instants, BT packets related to park beacons, BT packets related to link supervision time out protection during connection management, and BT packets related to master and slave roll switch, and the like.

In another example, a BT device 8A may be a BT-enabled HID device, and may communicate BT HID data packets on a regularly scheduled basis with BT communication module 32. BT HID data packets may be considered critical BT packets, since interrupted or delayed communication of BT HID data packets may be noticeable as performance degradation by a human operator.

In a yet another example, a BT device 8B may be a BT-enabled audio device, and may communicate BT audio streaming packets on a regularly scheduled basis over synchronous connection-oriented (SCO) time slots with BT communication module 32. BT audio streaming packets may be considered critical BT packets, since interrupted or delayed communication of BT audio streaming packets may be noticeable as performance degradation by a human operator.

WLAN communication module 10 may output a hard-wired WLAN channel indication 40 of the WLAN communication channel in use, and BT communication module 32 may receive hard-wired WLAN channel indication 40. If the piconet channel is AFH compatible, BT communication module 32 may utilize hard-wired WLAN channel indication 40 to exclude BT carrier frequencies that overlap the WLAN communication channel indicated by hard-wired WLAN channel indication 40 from the periodic pseudo random hopping sequence. For example, BT communication module 32 may exclude BT carrier frequencies within ±10 MHz from $F_{CWLAN}$ of the WLAN communication channel indicated by hard-wired WLAN channel indication 40.

However, BT communication module 32, even if complies with Bluetooth® core specifications v1.2, and is therefore AFH compatible, may hop through all seventy-nine BT carrier frequencies if any one of BT devices 8 does not comply with Bluetooth® core specifications v1.2, and is therefore not AFH compatible Consequently, interference time intervals may occur.

The longer the WLAN packets communicated by WLAN communication module 10, the higher the probability that critical BT packets received by BT communication module 32 may be corrupted. WLAN communication module 4 may communicate with one of WLAN devices 6 using, for example, a communication rate between 1 and 2 mega bits per second. The air duration of long WLAN packets communicated at this bit rate may reach 5-10 mS, and the probability of BT audio streaming packets communicated by BT communication module 32 to be corrupted may exceed 50%.

BT communication module 32 may output a hard-wired BT priority signal 42 to WLAN communication module 10. Hard-wired BT priority signal 42 may be asserted to, for example, a high logic level, to indicate that BT communication module 32 is in the process of receiving a critical BT packet, and may be de-asserted to, for example, a low logic level otherwise.

WLAN communication module 10 may include a processor 44 coupled to transceiver 22, and a memory 46 coupled to processor 44. Processor 44 may receive hard-wired BT priority signal 42. Memory 46 may store a fragmentation control module 48 and a coexistence activation module 50, to be executed by processor 44. Memory 46 may store in addition a threshold parameter (BT_THR) 52 and a flag 53.

WLAN devices 6 may each include a processor 54 coupled to transceiver 14, and a memory 56 coupled to processor 54. Memory 56 may store a copy of fragmentation control module 48, to be executed by processor 54, and may store a threshold parameter (BT_THR) 62 and a flag 63.

BT_THR 52 may be related to the probability that critical BT audio streaming packets communicated by BT communication module 32 may be corrupted by WLAN packets communicated by WLAN communication module 10. WLAN packets having an air time of more than the value of BT_THR 52, which may be, for example, 170 uS, may be considered as having a high probability to corrupt BT audio streaming packets communicated by BT communication module 32.

The value of BT_THR 52 may be determined in relation to attributes of BT communication module 32, such as, for example, a manufacturer identity, a model number, a hardware revision, a firmware revision, and the like. According to some embodiments of the invention, BT_THR 52 may be a configuration parameter, such as, for example, in a registry of a WINDOWS® operated personal computer. According to other embodiments of the invention, BT_THR 52 may be a dynamically adaptable parameter.

Figure 2:
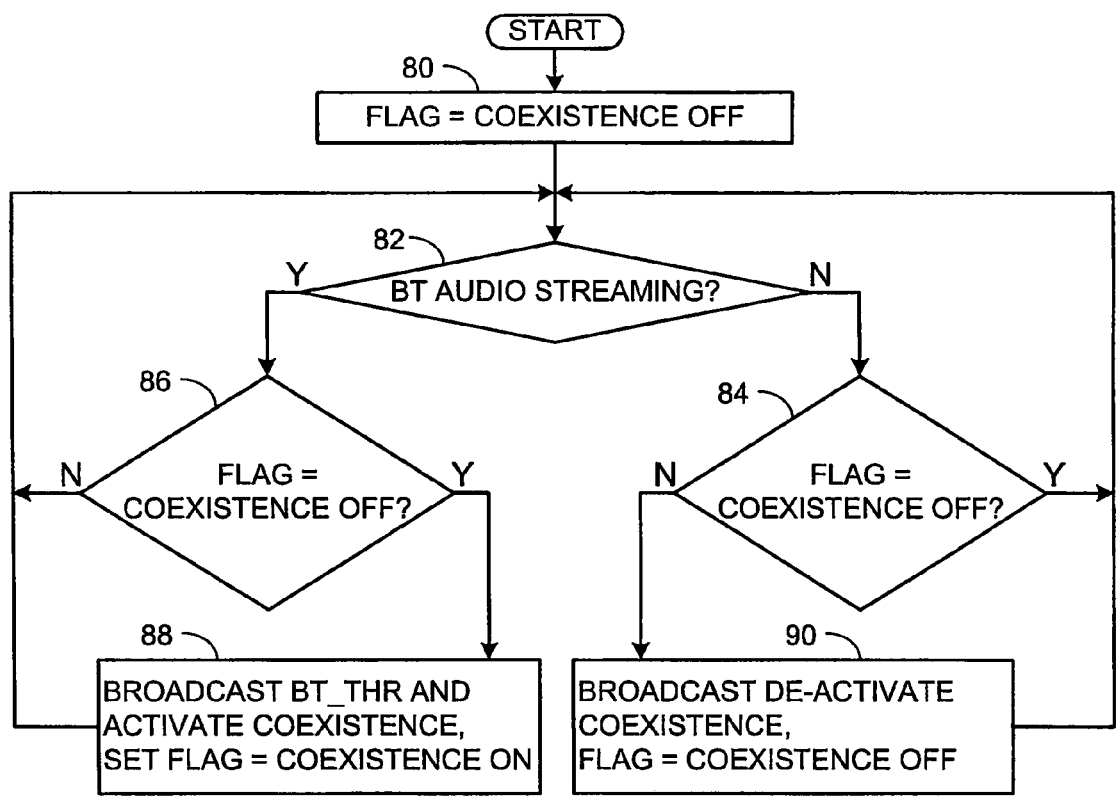
FIG. 2 is a simplified flowchart illustration of an exemplary method to control fragmentation of WLAN packets to reduce interference with Bluetooth® synchronous connection-oriented communication, according to some embodiments of the invention.

Reference is made now to FIG. 2, which is a simplified flowchart illustration of an exemplary method for activation of BT audio streaming coexistence mode in a WLAN cell, according to some embodiments of the invention.

At the beginning of the method, coexistence activation module 50 may set a flag 53 to a "coexistence off" state (80), and may monitor hard-wired BT priority signal 42 for BT audio streaming communication (82).

BT audio streaming communication may be identified, for example, from an assertion time percentage of hard-wired BT priority signal 42. For example, the assertion time percentage of hard-wired BT priority signal 42 for activities such as page scan and inquiry scan may be approximately 0.467% and 0.234%, respectively, and for BT HID data packets, approximately 1.66%. The assertion time percentage of hard-wired BT priority signal 42 for BT audio streaming communication using high quality voice type 3 (HV3) packets may be approximately 4.43% for receipt of protected HV3 packets. Therefore, BT audio streaming communication using HV3 packets may be identified from an assertion time percentage of hard-wired BT priority signal 42 exceeding a predetermined threshold such as 4.4%.

As long as BT audio streaming communication is not identified and flag 53 is in a "coexistence off" state (84), the method may go back to box (82). If BT audio streaming communication is identified in box (80) since flag 53 is in a "coexistence off" state (86), coexistence activation module 50 may set flag 53 to a "coexistence on" state, and may transmit the values of BT_THR 52 and flag 53 to WLAN devices 6 (88). The method may than continue to box (82).

In response, WLAN devices 6 may copy the values of BT_THR 52 and flag 53 into BT_THR 62 and flag 63, respectively.

As long as a BT audio streaming communication is identified in box (82), the method may loop back to box (82) through box (86) since flag 53 is in a "coexistence on" state. After BT audio streaming communication is not identified anymore in box (82), if flag 53 is in a "coexistence on" state (86), coexistence activation module 50 may set flag 53 to a "coexistence off" state, and may transmit the value of flag 53 to WLAN devices 6 (90). The method may than continue to box (82).

In response, WLAN devices 6 may copy the value of flag 53 into flag 63.

Figure 3:
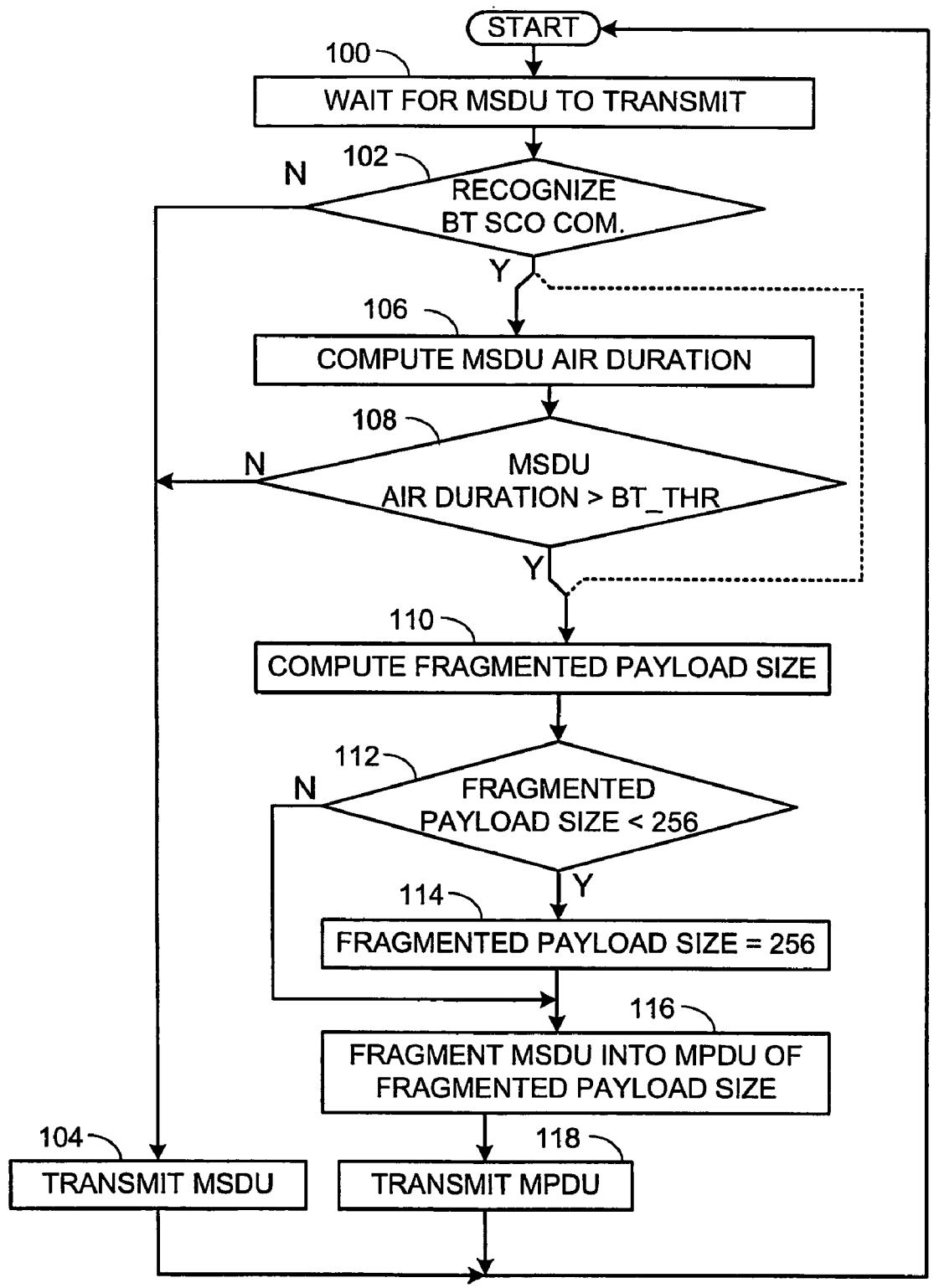
FIG. 3 is a simplified flowchart illustration of an exemplary method for dynamically fragmenting WLAN packets to be transmitted in a WLAN cell, according to some embodiments of the invention.

Reference is made now to FIG. 3, which is a simplified flowchart illustration of an exemplary method for dynamically fragmenting WLAN packets to be transmitted in a WLAN cell, according to some embodiments of the invention.

The following description of fragmentation control module 48 is applicable to WLAN communication module 10 and to WLAN devices 6. In the following description of FIG. 3, in relation to WLAN communication module 10, the terms "WLAN unit", "BT_THR" and "flag" relates to WLAN communication module 10, BT_THR 52 and flag 53, respectively, while in relation to WLAN devices 6, the terms "WLAN unit", "BT_THR" and "flag" relates to one of WLAN devices 6, BT_THR 62 and flag 63, respectively.

Fragmentation control module 48 may fragment WLAN packets to be transmitted and having an air time of more than BT_THR into WLAN packets having air time of no more than BT_THR, to reduce the probability of the WLAN packets to corrupt BT audio streaming packets. Fragmentation control module 48 may dynamically fragment WLAN packets, with the decision to fragment being made on an individual basis.

In the specifications below, WLAN packets before fragmentation are denoted MAC Service Data Units (MSDU), and WLAN packets after fragmentation are denoted MAC Protocol Data Units (MPDU).

If the flag is set to the "coexistence off" state (102), the WLAN unit may transmit the MSDU (104), and the method may terminate. Otherwise, According to some embodiments of the invention, the method may continue to box (106), while according to alternate embodiments of the invention, the method may skip boxes (106) and (108) and may continue to box (110).

In box (106), fragmentation control module 48 may compute air duration $T_1$ of the MSDU to be sent. Air duration $T_1$ may be related, for example, to the number $F_1$ of payload bytes, the communication rate and the physical layer overhead time. The physical layer overhead time may be affected by the communication rate and the MSDU protection features.

$$T_1 = PhyOverhead(\text{rate, protection}) + \frac{F_1}{\text{rate}} \quad (1)$$

Fragmentation control module 48 may compare air duration $T_1$ to BT_THR (108), and if $T_1$ is no higher than BT_THR, the WLAN unit may transmit the MSDU (104), and may terminate. Otherwise, fragmentation control module 48 may compute a fragmented payload length $F_2$ (110), so that a MPDU having a payload length equal to fragmented payload length $F_2$ has an air duration $T_2$ that is equal to BT_THR, as shown in equation 2.

$$T_2 = BT\_THR = PhyOverhead + \frac{F_2}{\text{rate}} \quad (2)$$

If the WLAN unit communicates MSDU and MPDU with substantially equal communication rates and physical layer overhead times, fragmentation control module 48 may compute $F_2$, using, for example, equation 3.

$$F_2 = (BT_{13}THR - PhyOverhead) * \text{rate} \quad (3)$$

Standard 802.11b/g defines a minimum payload length of 256 bytes for a MPDU. Fragmentation control module 48 may check whether fragmented payload length $F_2$ is less than 256 bytes (112), and if so, may set $F_2$ to be 256 bytes (114). Fragmentation control module 48 may fragment the MSDU into MPDUs having fragmented payload length $F_2$ (116). The WLAN unit may transmit the MPDUs (118) and may terminate.

A non-exhaustive list of examples for antennae 12, 20, 26 and 34 includes dipole antennae, monopole antennae, multi-layer ceramic antennae, Planar inverted-F antennae, loop antennae, shot antennae, dual antennae, omni-directional antennae or any other suitable antennas.

A non-exhaustive list of examples for processors 44 and 54 includes a central processing unit (CPU), a digital signal processor (DSP), a reduced instruction set computer (RISC), a complex instruction set computer (CISC) and the like. Moreover, processor 44 and/or processor 54 may be part of an application specific integrated circuit (ASIC) or may be a part of an application specific standard product (ASSP).

Memories 46 and 56 may be fixed in or removable from WLAN communication module 10 and WLAN device 6, respectively. A non-exhaustive list of examples for memories 46 and 56 includes any combination of the followings:

semiconductor devices, such as
registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like,
optical devices, such as compact disk read only memory (CD ROM), and the like,
and magnetic devices, such as
a hard disk, a floppy disk, a magnetic tape, and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method for reducing interference between Bluetooth synchronous connection-oriented communication and 802.11 packet transmission, the method comprising:
   identifying that a Bluetooth-enabled device is communicating Bluetooth synchronous connection-oriented communication;
   identifying that said Bluetooth-enabled device is communicating critical Bluetooth packets if an assertion time percentage of a priority signal asserted by said Bluetooth-enabled device exceeds a predetermined threshold: and fragmenting an 802.11 packet into smaller packets to be transmitted concurrently with at least a portion of said Bluetooth synchronous connection-oriented communication and transmitting said smaller packets instead of said 802.11 packet if said Bluetooth-enabled device is communicating critical Bluetooth packets.

2. The method of claim 1, wherein identifying that said Bluetooth-enabled device is communicating Bluetooth synchronous connection-oriented communication includes:

monitoring a hard-wired priority signal asserted by said Bluetooth-enabled device to indicate critical Bluetooth packets.

3. The method of claim 1, wherein said predetermined threshold is 4.4%.

4. The method of claim 1, further comprising:

ensuring that a payload length of each of said smaller packets is no smaller than a predetermined payload length.

5. A method for reducing interference between Bluetooth communication and 802.11 packet transmission, the method comprising:

distinguishing different types of Bluetooth communication performed by a Bluetooth-enabled device from an assertion time percentage of a hard-wired priority signal that is asserted by said Bluetooth-enabled device to indicate critical Bluetooth packets, said hard-wired priority signal being received by an 802.11-enabled device; and transmitting an air time threshold that is related at least in part to attributes of the Bluetooth-enabled device to the 802.11-enabled device if the assertion time percentage is above a predetermined assertion time percentage threshold.

6. The method of claim 5, further comprising:

identifying that said assertion time percentage exceeds a predetermined threshold, thus recognizing that said Bluetooth-enabled device is communicating a Bluetooth synchronous connection-oriented communication type using high quality voice type 3 packets.

7. The method of claim 6, wherein said predetermined threshold is 4.4%.

8. The method of claim 6, further comprising:

determining whether a particular 802.11 packet to be transmitted will have an air time that exceeds the air time threshold; and if said air time exceeds said air time threshold, fragmenting said particular 802.11 packet into smaller packets so that each of said smaller packets will have an air time that does not exceed said air time threshold, and transmitting said smaller packets instead of said 802.11 packet.

9. The method of claim 8, wherein if said particular 802.11 packet will have an air time that does not exceed said air time threshold, transmitting said particular 802.11 packet.

10. The method of claim 8, wherein said particular 802.11 packet is a medium access control service data unit packet and said smaller packets are medium access control protocol data unit packets.

11. The method of claim 8, further comprising:

sending an 802.11-enabled device that is to transmit said particular 802.11 packet a wireless message from another 802.11-enabled device, said message indicating that said Bluetooth-enabled device is communicating a Bluetooth synchronous connection-oriented communication type using high quality voice type 3 packets.

12. A method for reducing interference between Bluetooth synchronous connection-oriented communication and 802.11 packet transmission, the method comprising:

monitoring a hard-wired priority signal asserted by Bluetooth-enabled device to indicate critical Bluetooth packets, said Bluetooth-enabled device communicating said Bluetooth synchronous connection oriented communication, wherein said indication is created by identifying that an assertion time percentage of said priority signal exceeds a predetermined threshold; and in view of said indication, determining whether an 802.11 packet will have an air time of sufficient duration to interfere with said communication and if so, fragmenting said 802.11 packet into smaller packets and transmitting said smaller packets instead of said 802.11 packet.

13. The method of claim 12, further comprising:

receiving said indication via 802.11 communication.

14. The method of claim 12, wherein said predetermined threshold is 4.4%.

15. An article comprising a memory having stored therein instructions that, when executed by a computing platform, result in:

distinguishing different types of Bluetooth communication performed by a Bluetooth-enabled device from an assertion time percentage of a hard-wired priority signal that is asserted by said Bluetooth-enabled device to indicate critical Bluetooth packets, said hard-wired priority signal being received by an 802.11-enabled device; and transmitting an air time threshold that is related at least in part to attributes of the Bluetooth-enabled device to the 802.11-enabled device if the assertion time percentage is above a predetermined threshold.

16. The article of claim 15, wherein said instructions, when executed by said computing platform, further result in:

identifying that said assertion time percentage exceeds the predetermined threshold, thus recognizing that said Bluetooth-enabled device is communicating a Bluetooth synchronous connection-oriented communication type using high quality voice type 3 packets.

17. The article of claim 16, wherein said predetermined threshold is 4.4%.

18. The article of claim 16, wherein said instructions, when executed by said computing platform, further result in:

sending a second 802.11-enabled device a wireless message indicating that said Bluetooth-enabled device is communicating said Bluetooth synchronous connection-oriented communication type using high quality voice type 3 packets.

19. An article comprising a memory having stored therein instructions that, when executed by a computing platform, result in:

monitoring a hard-wired priority signal asserted by Bluetooth-enabled device to indicate critical Bluetooth packets, said Bluetooth-enabled device communicating said Bluetooth synchronous connection oriented communication;

wherein said indication is created by identifying that an assertion time percentage of said priority signal exceeds a predetermined threshold; and in view of said indication, determining whether an 802.11 packet will have an air time of sufficient duration to interfere with said communication and if so, fragmenting said 802.11 packet into smaller packets and transmitting said smaller packets instead of said 802.11 packet.

20. The article of claim 19, wherein said instructions, when executed by said computing platform, further result in:
ensuring that a payload length of each of said smaller packets is no smaller than a predetermined payload length.

21. The article of claim 19, wherein said instructions, when executed by said computing platform, further result in:
transmitting said 802.11 packet if said 802.11 packet will not have an air time of sufficient duration to interfere with said communication.

22. An apparatus comprising:
a monopole antenna;
an 802.11 transceiver coupled to said antenna;
a Bluetooth communication module to provide said processor with a hard-wired priority signal that is asserted by said Bluetooth communication module to indicate critical Bluetooth packets of a Bluetooth synchronous connection-oriented communication; and
a processor to identify the existence of said critical packets based on an assertion time percentage of said priority signal; to fragment an 802.11 packet having an air time of sufficient duration to interfere with said critical packets into smaller packets and to cause said transceiver to transmit said smaller packets instead of said 802.11 packet via said antenna.

23. The apparatus of claim 22, wherein said processor is to fragment said 802.11 packet in view of said transceiver having received an indication of said Bluetooth synchronous connection-oriented communication.

24. A wireless communication system comprising:
an apparatus including at least:
a Bluetooth communication module to assert a hard-wired priority signal to indicate communication of critical Bluetooth packets;
a first 802.11 transceiver; and
a first processor to receive said hard-wired priority signal, to identify the existence of said critical packets of Bluetooth synchronous connection-oriented communication based on an assertion time percentage of said priority signal, to fragment a first 802.11 packet that will have a first air time of sufficient duration to interfere with critical packets of Bluetooth synchronous connection-oriented communication of said Bluetooth communication module into first smaller packets, and to cause said first transceiver to transmit said first smaller packets instead of said first 802.11 packet;
and
an 802.11-enabled device including at least:
a second 802.11 transceiver; and
a second processor.

25. The wireless communication system of claim 24, wherein said first processor is to cause said first transceiver to send an indication of the existence of said critical packets of Bluetooth synchronous connection-oriented communication to said 802.11-enabled device.

26. The wireless communication system of claim 25, wherein in view of receipt of said indication, said second processor is to fragment a second 802.11 packet that will have a second air time of sufficient duration to interfere with said critical packets of Bluetooth synchronous connection-oriented communication into second smaller packets and to cause said second transceiver to transmit said second smaller packets instead of said second 802.11 packet.

* * * * *